United States Patent [19]

Zipser

[11] Patent Number: 4,474,522

[45] Date of Patent: Oct. 2, 1984

[54] APPARATUS FOR POWERING A BALE WAGON TIER-TYING DEVICE

[75] Inventor: Randall E. Zipser, Lititz, Pa.

[73] Assignee: Sperry Corporation, New Holland, Pa.

[21] Appl. No.: 413,107

[22] Filed: Aug. 30, 1982

[51] Int. Cl.³ .................... A01D 87/12; B65G 57/32
[52] U.S. Cl. ................................ 414/40; 198/374; 198/434; 414/62; 414/68
[58] Field of Search .................. 414/39, 40, 44, 62, 414/68, 111; 198/374, 434

[56] References Cited

U.S. PATENT DOCUMENTS

| | | | |
|---|---|---|---|
| 3,395,814 | 8/1968 | Grey | 414/40 |
| 3,664,519 | 5/1972 | Grey | 414/40 |
| 3,862,692 | 1/1975 | Butler | 414/39 |
| 3,927,771 | 12/1975 | Butler et al. | 414/40 |
| 4,063,652 | 12/1977 | Lee | 414/40 |
| 4,150,756 | 4/1979 | Butler | 414/40 |

FOREIGN PATENT DOCUMENTS 483957 12/1975 U.S.S.R. .................. 414/40

Primary Examiner—Leslie J. Paperner
Attorney, Agent, or Firm—Larry W. Miller; Frank A. Seemar; Darrell F. Marquette

[57] ABSTRACT

A mechanism for powering the formation of a tie-tier on a bale wagon is disclosed wherein the drive for pivotally moving the first table to convey a set of three bales onto the second table provides the driving power to kick the center bale back onto the first table. The movememt of the kicker mechanism to move the center bale back onto the first table effects a movement of a spiking mechanism to fix the exterior ends of the outer bales of the set conveyed onto the second table for rotation about vertically extending spikes and effects the movement of a two bale trip from a retracted position. A latching mechanism is provided to latch the kicking mechanism in a forward position so as to maintain the spiking mechanism and the two bale trip in operative positions during the formation of the tie-tier.

17 Claims, 16 Drawing Figures

APPARATUS FOR POWERING A BALE WAGON TIER-TYING DEVICE

BACKGROUND OF THE INVENTION

The present invention relates generally to bale wagons and, more particulary, to the formation of a tie-tier on a three-bale-wide bale wagon.

Bale wagons are operable to pick up bales of crop material, such as hay or straw, from a field to form a stack of bales that can be transported to some remote location and unloaded. Generally, the stack of bales is formed when a pickup mechanism elevates bales from the ground onto a first bale receiving table. After a predetermined number of bales have been positioned in a row on the first table, the row of bales is conveyed to a second tier forming table. After a predetermined number of rows of bales have been positioned on the second table, the tier of bales is conveyed onto a third table to form a stack.

It is well known that the provision of a tie-tier, i.e., a tier of bales with the bales arranged in a different configuration than adjacent tiers, greatly stabilizes the stack of bales. Although the tier-tier is sometimes formed by hand, various mechanisms, such as can be found in U.S. Pat. No. 3,395,814 issued to Gorden E. Grey on Aug. 6, 1968, and in U.S. Pat. No. 3,927,771 issuing to Lee D. Butler on Dec. 23, 1975, and U.S. Pat. No. 3,664,519 issued to Donald M. Grey on May 23, 1972, have been provided for automatically forming a tie-tier. However, such mechanisms are relatively expensive and generally are not always applicable to a three-bale-wide bale wagon. Accordingly, it would be desirable to provide an apparatus for powering the formation of a tie-tier on a three-bale-wide that can be inexpensively contructed and used in conjunction with the mechanical first table conveying mechanism, as found in U.S. Pat. No. 3,862,692 issuing to Gene R. Butler on Jan. 28, 1975.

SUMMARY OF THE INVENTION

It is an object of this invention to overcome the aforementioned disadvantages of prior art by providing a tie-tier forming mechanism operably powered by the drive for the first table.

It is another object of this invention to provide a tie-tier forming apparatus to automatically form a tie-tier on a three-bale-wide bale wagon.

It is yet another object of this invention to provide a mechanism for mechanically moving the center bale of a set of three bales from the second table back onto the first table.

It is a feature of this invention that the tie-tier forming apparatus is mechanically driven.

It is an advantage of this invention that the tie-tier forming mechanism can be set at any time after the last first table delivery of the preceding standard tier and before the initial first table delivery of the tie-tier.

It is another advantage of this invention that the operator of the bale wagon has more flexibility in setting the tie-tier forming apparatus into operation.

It is another feature of this invention that the spikes are not engaged into the outer bales of a set of three bales until after the center bale has started its movement back onto the first table.

It is still another advantage of this invention that the delay between moving the center bale and spiking the outer bales of a set of three bales helps keep the two outside bales from following the center bale back onto the first table.

It is yet another advantage of this invention that the tie-tier forming mechanism is not manually actuated.

It is still a further object of this invention to provide an apparatus for forming a tie-tier on a three-bale-wide bale wagon which is durable of construction, inexpensive of manufacture, carefree of maintenance, and simple and effective in use.

These and other objects, features and advantages are accomplished according to the instant invention by providing a mechanism for powering the formation of a tie-tier on a bale wagon wherein the drive for pivotally moving the first table to convey a set of three bales onto the second table provides the driving power to kick the center bale back onto the first table. The movement of the kicker mechanism to move the center bale back onto the first table effects a movement of a spiking mechanism to fix the exterior ends of the outer bales of the set conveyed onto the second table for rotation about vertically extending spikes and effects the movement of a two bale trip form a retracted position. A latching mechanism is provided to latch the kicking mechanism in a forward position so as to maintain the spiking mechanism and the two bale trip in operative positions during the formation of the tie-tier.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
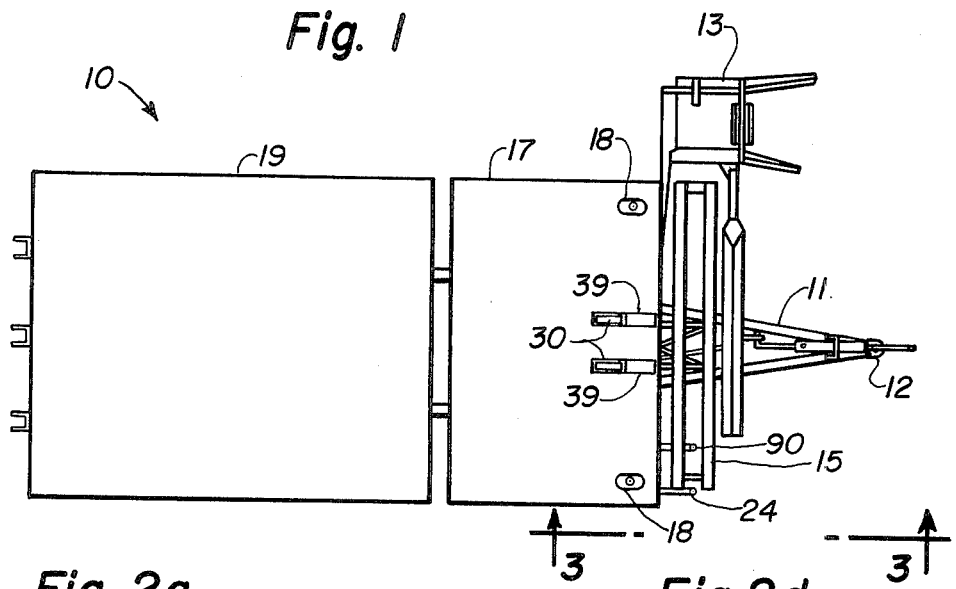
FIG. 1 is a top-plan view of a bale wagon incorporating the principles of the instant invention.

Referring now to the drawings, and particularly to FIG. 1, a top-plan view of a bale wagon incorporating the principles of the instant invention can be seen. The bale wagon 10 will generally include a mobile frame 11 which can be adapted for connection to a prime mover, such as by a hitch 12, or can be a self-propelled structure. The operation of the bale wagon 10 to form a stack of bales is well known in the art. A pickup mechanism 13 engages bales lying on the ground and elevates them onto the first table 15 in an end-to-end fashion to form a row of bales. Each row of bales is conveyed from the first table 15 onto the second table 17 until a tier of bales is completed, whereupon the tier of bales is placed on the third table 19 to form a stack by a conveying mechanism (not shown). As can be seen in FIG. 1a, the instant invention is directed to a bale wagon utilizing a standard set of three bales per row.

Figure 3:
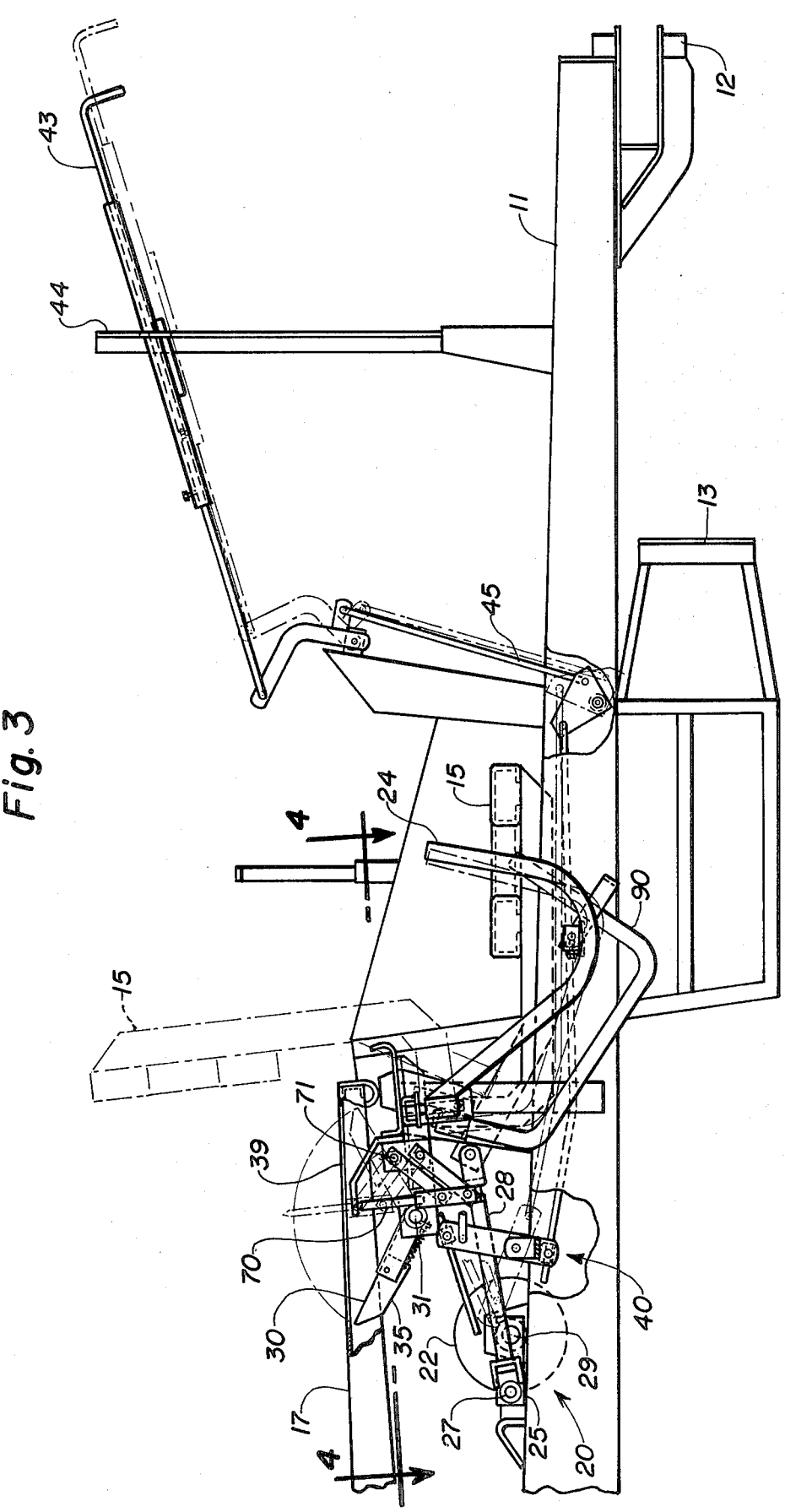
FIG. 3 is a partial side-elevational view of a bale wagon taken along lines 3—3 of FIG. 1, the movement of the first table, the actuating lever and the kicker mechanism being shown in phantom.
Figure 4:
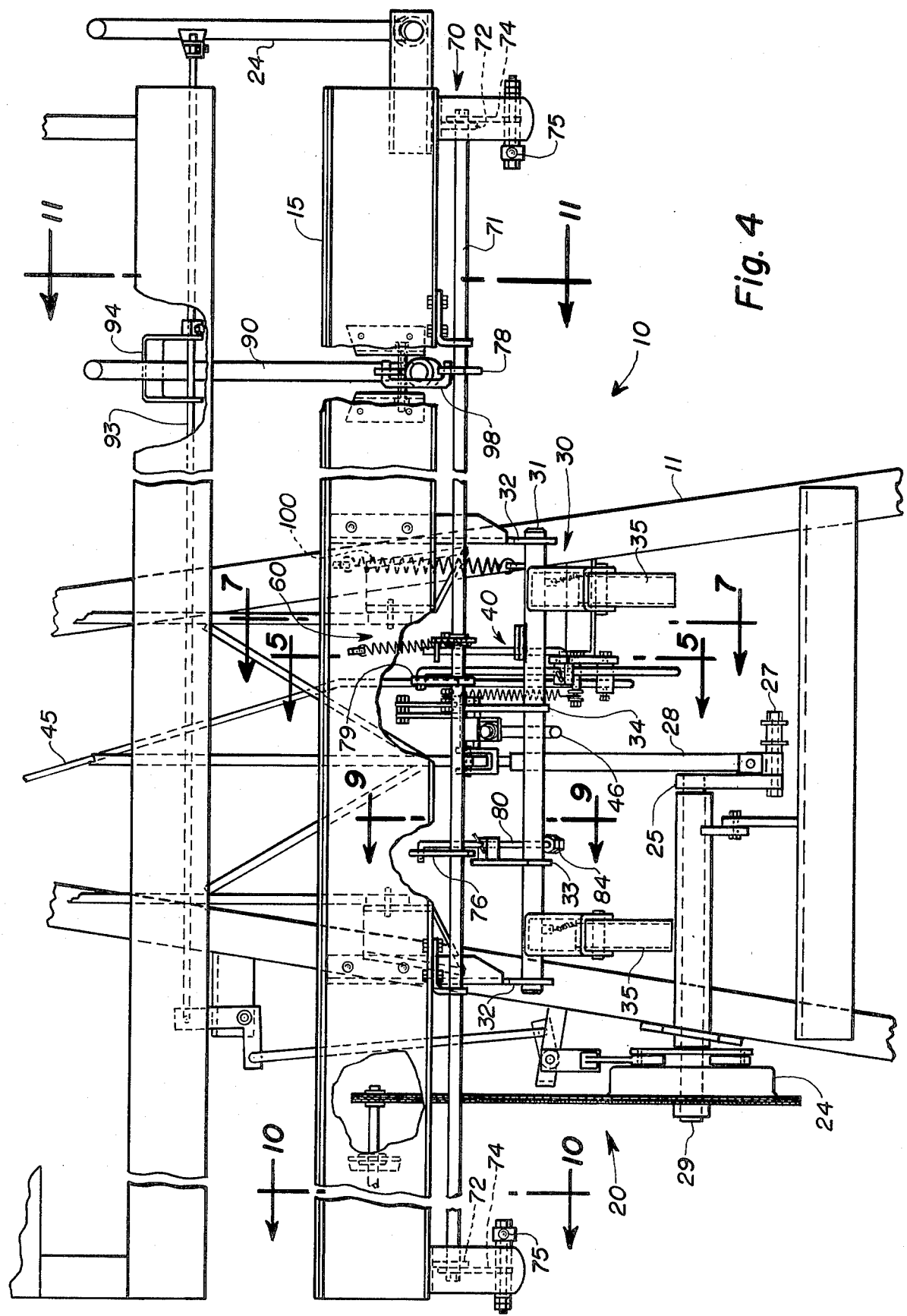
FIG. 4 is a partial top-plan view of the bale wagon taken along lines 4—4 of FIG. 3 with the second table removed and portions of the first table broken away to more clearly show the instant invention.

Referring now to FIGS. 3 and 4, it can be seen that the first table 15 is pivotally mounted on the frame 11 for movement between a bale receiving position and a bale transfer position to convey bales onto the second table 17. The drive mechanism 20 for pivotally moving the first table 15 includes a single revolution clutch 22 actuatable by a three bale position trip 24 to cause rotation of a rotatable member 25 having a crank 27 rotatable at a distance spaced from the axis of rotation 29 of the rotatable member 25. A linkage mechanism 28 interconnects the crank 27 and the first table 15 to effect a pivotal movement of the first table 15. The drive mechanism 20 is described in further detail in U.S. Pat. No. 3,862,692 issued to Gene R. Butler on Jan. 28, 1975, the contents thereof are incorporated herein by reference.

With reference to FIGS. 2a through 2f, it can be seen that a tie-tier can be formed on a three-bale-wide bale wagon by moving the center bale of the first set of three bales having been conveyed from the first table 15 onto the second table 17, back onto the first table 15. By spiking the exterior ends of the two outer bales of this first set of bales and positioning a two bale position trip, a series of sets of two bales can be conveyed onto the second table 17 between the two outer bales of the first set of three bales, the outer bales rotating about an axis of rotation defined by the respective spikes.

Referring now to FIGS. 3, 4, 5 and 6, the kicker mechanism 30 for moving the center bale back onto the first table 15 can be seen. The kicker mechanism 30 includes a transverse shaft 31 rotatably supported on the frame 11 by a pair of spaced-apart brackets 32. As will be described in further detail below, a first connecting member 33 is affixed to the shaft for effecting movement of the spiking mechanism 70. A second connecting member 34 is also affixed to the shaft 31 and is connected to the actuating mechanism 40 for effecting a rotational movement of the shaft 31.

A pair of spaced-apart kicker members 35 are affixed to the shaft 31 and can project upwardly through slots 39 formed in the second table 17, as is best seen in FIG. 1, to engage the center bale and move it forwardly back onto the first table 15. Each kicker member 35 includes a base member 36 rigidly affixed to the shaft 31 and a bale engaging member 37 pivotally connected to the base member 36. The bale engaging member 37 and the base member 36 are constructed and arranged so that the bale engaging member 37 is free to pivotally move in a forward direction, but will not move rearwardly relative to the base member 36 beyond the linearly extending position seen in FIG. 5. A spring 38 interconnecting the base member 36 and the bale engaging member 37 biases the bale engaging member 37 into the aforementioned linearly extending position.

Figure 5:
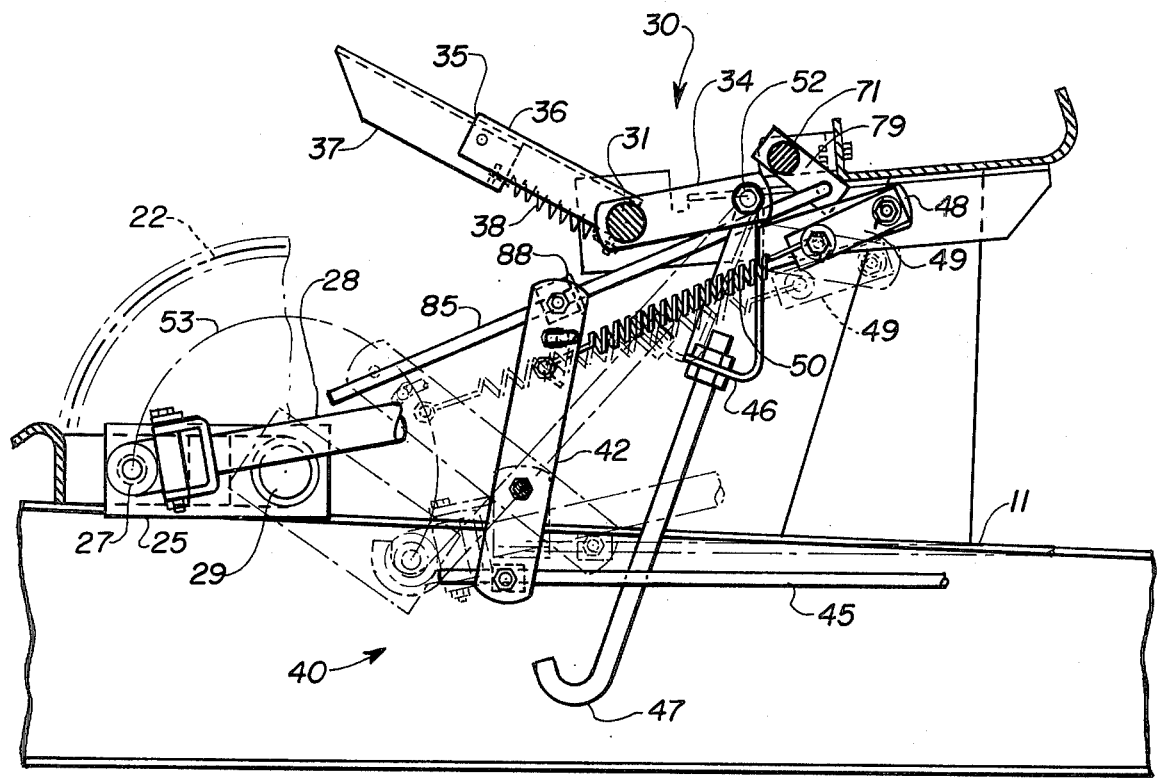
FIG. 5 is a partial cross-sectional detail view of the bale wagon taken along lines 5—5 of FIG. 4, certain movements of the actuating mechanism and the rotatable drive mechanism being shown in phantom, extraneous background structure being omitted for purposes of clarity.
Figure 6:
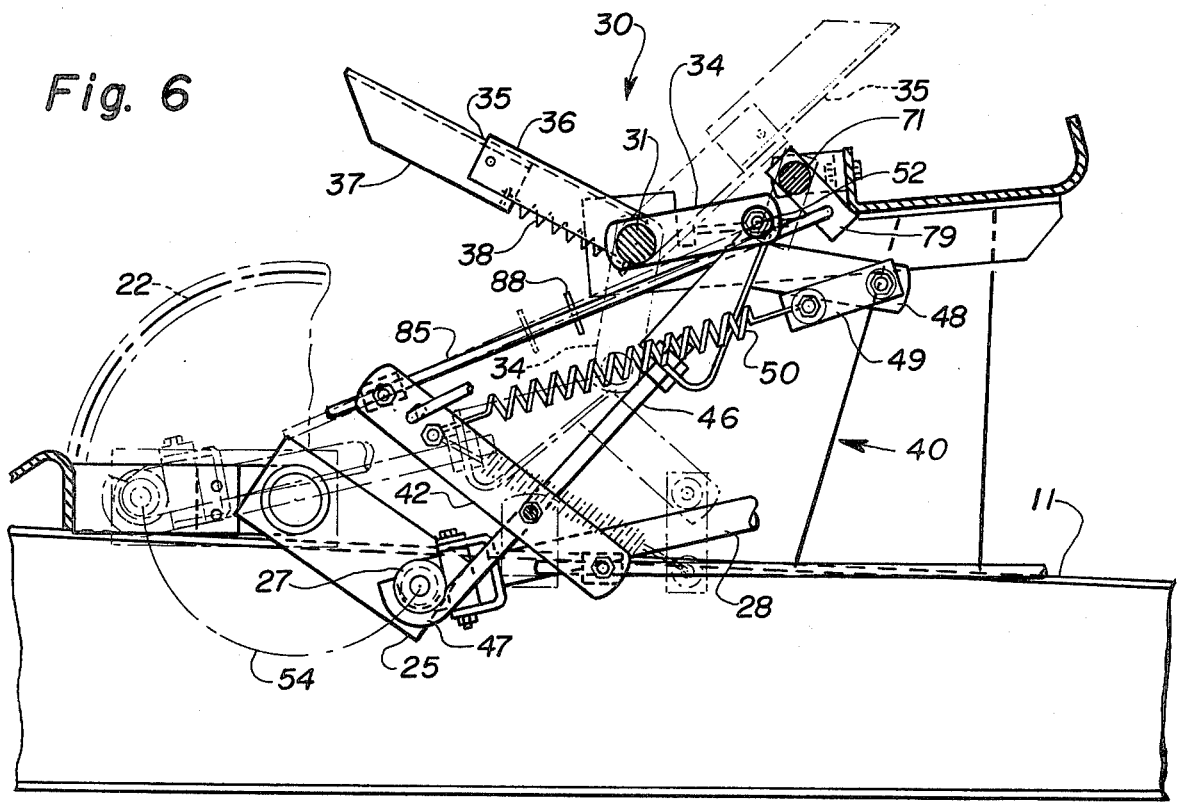
FIG. 6 is a partial cross-sectional detail view corresponding to FIG. 5 showing the movement of the mechanism after the crank has engaged the drive member.

To actuate the movement of the kicker members 35 from the rearward position seen in solid lines in FIG. 6 to the forward position seen in phantom in FIG. 6, an actuation mechanism 40 is connected to the kicker mechanism 30 and engageable with the crank 27 on the rotatable member 25. The actuation mechanism 40 includes a link 42 pivotally mounted on the frame 11 for movement between a first position seen in FIG. 5 and a second position seen in FIG. 6.

To move the link 42 from the first position to the second position and thereby set the actuation mechanism 40 for engagement with the crank 27, as will be described in further detail below, it is necessary for the operator to manipulate the actuation lever 43 by moving it to the position seen in phantom in FIG. 3 and securing it against the support post 44. A connecting linkage 45 consisting of a series of elongated rods and bell cranks interconnect the actuation lever 43 and the link 42 to transfer the movement of the actuation lever 43 to effect a movement of the link 42 between the first and second positions.

The actuation mechanism 40 further includes a drive member 46 having a hook 47 at one end and being pivotally connected to the second connecting member 34 at the other end. A tab 48 affixed to the drive member 46 and extending outwardly therefrom serves to pivotally connect a connecting link 49 and an attached spring 50 which interconnects the connecting link 49 and the link 42. It should be noted that when the drive member 46 is in the engagement position, the hook 47 is engageable with the crank 27 to effect a rotation of the kicker shaft 31, as seen in phantom in FIG. 6, thereby moving the kicker member 35 from its rearward position to its forward position.

The operation of the actuation mechanism 40 is best seen in FIGS. 5 and 6. An appropriate manipulation of the actuation lever 43 moves the link 42 from its first position, seen in solid lines in FIG. 5, to its second position, seen in phantom in FIG. 5. The movement of the link 42 extends the spring 50 causing the drive member 46 to rotate about its pivotal connection 52 with the second connecting member 34 of the kicker mechanism 30, such that the drive member 46 is moved from its free position, seen in solid lines in FIG. 5, to an engagement position, seen in phantom in FIG. 5. When the drive member 46 has moved into its engagement position, the hook 47 is moved into the path of rotation of the crank 27 of the rotatable member 25. When the appropriate number of bales have been loaded onto the first table and the single revolution clutch 22 is actuated, the crank 27 is rotated along the arcuate path 53 into engagement with the hook 47 of the drive member 46.

As can be seen in both FIGS. 5 and 6, the crank 27 does not engage the hook 47 until the second half of its single revolution of movement. Accordingly, the kicker mechanism 30 is not driven until the first table 15 has begun movement back into its bale receiving position. As is best seen in FIG. 6, the crank 27 pulls the drive member 46 along the remainder of its single revolution back to the point of beginning, as is indicated by the arcuate path 54. The movement of the drive member 46 from the position seen in solid lines in FIG. 6 to the position seen in phantom in FIG. 6 effects a movement of the kicker members 35 to their forward position, as seen in phantom in FIG. 6. Because of the shape of the hook 47 and the position of the pivot 52, the drive member 46 will become disengaged from the crank 27 and drop into a free position by gravity with the kicker mechanism 30 being latched into the forward position, as will be described in further detail below.

Figure 7:
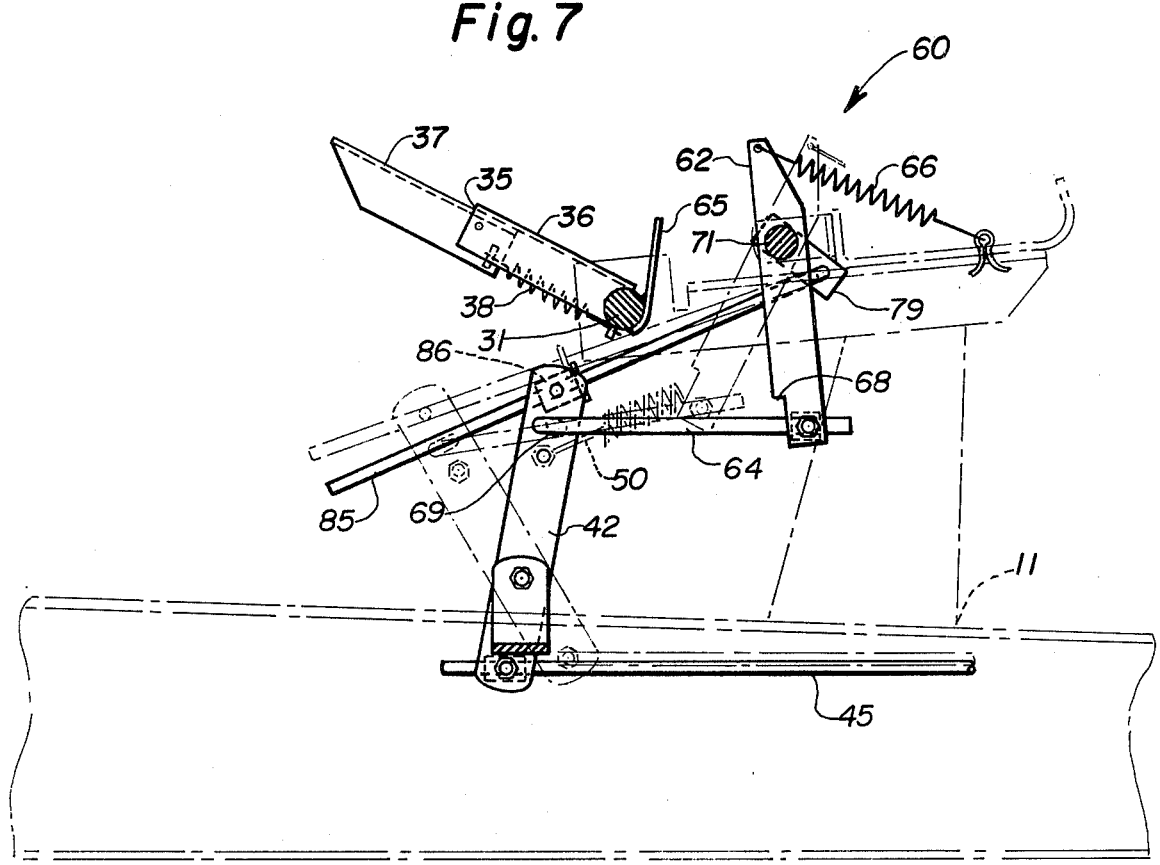
FIG. 7 is a partial cross-sectional detail view of the bale wagon taken along lines 7—7 of FIG. 4 to show the latching mechanism for the kicking members prior to actuation of the tie-tier forming apparatus, extraneous background structure being omitted for clarity.
Figure 8:
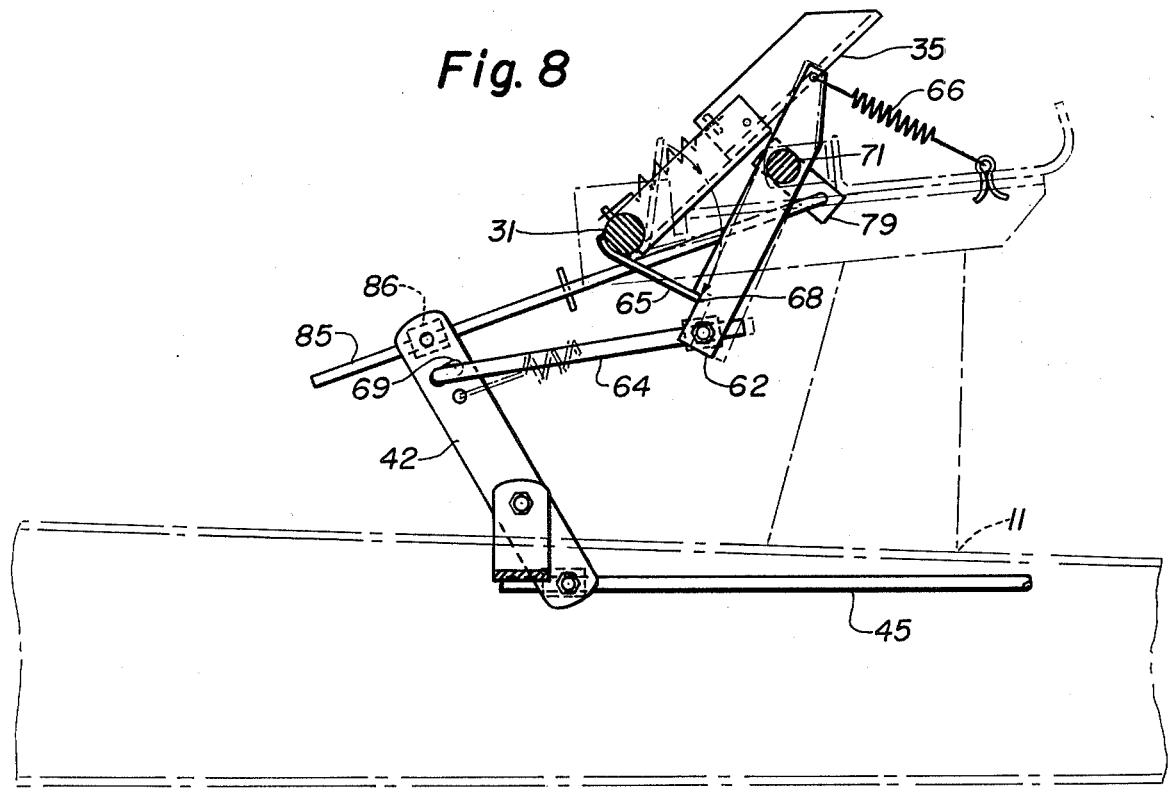
FIG. 8 is a partial cross-sectional detail view of the bale wagon corresponding to FIG. 7 but showing the relationahip of the various components after the kicker member has been latched in its forward position, extraneous background structure being omitted for clarity.

For reasons that will become apparent, it is desirable to latch the kicker members 35 into their forward position during the formation of the tie-tier by a latching mechanism 60, best seen in FIGS. 7 and 8. A latching member 62 is pivotally mounted on the frame 11 and is connected to the link 42 by means of an elongated rod 64. As can be seen in phantom in FIG. 7, the movement of the link 42 into its second position causes a corresponding movement of the latching member 62 into a latching position. A spring 66 interconnecting the latching member 62 and the frame 11 urges the latching member 62 toward its latching position.

When the kicker members 35 are moved into their forward position, a latching tab 65 affixed to the kicker shaft 31 proximate to the latching member 62 is rotated into engagement with the latching member 62 to be secured beneath a notch 68 formed in the latching member 62. As is best seen in FIG. 8, the link 42 includes a slot-shaped hole 69 for connection with the elongated rod 64. The slot-shaped hole 69 and the biasing spring 66 permit a slight rotation of the latching member 62, as seen in phantom in FIG. 8, to accommodate the movement of the latching tab 65 to secure it beneath the notch 68. Accordingly, the kicker mechanism 30 will be latched in its forward position until released, as will be described in further detail below.

Figure 2A:
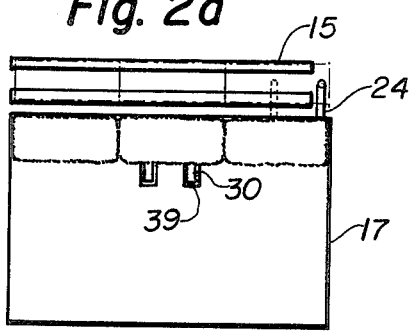
FIG. 2a through 2f are diagrammatic views of the first and second tables of the bale wagon seen in FIG. 1 showing the sequential operation of the formation of a tie-tier.
Figure 2D:
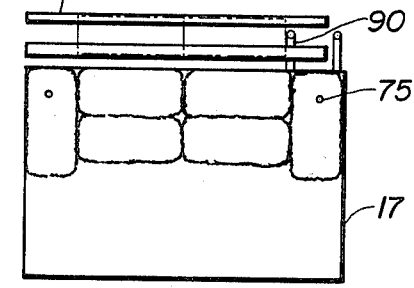
Figure 2B:
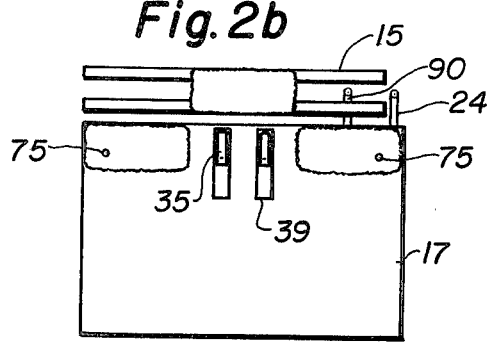
Figure 2E:
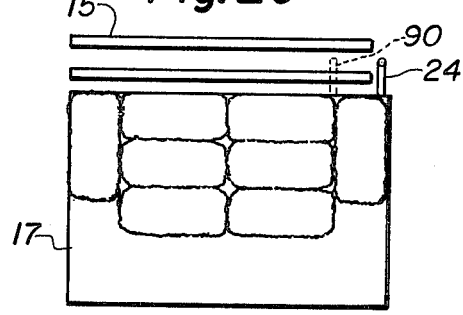
Figure 2C:
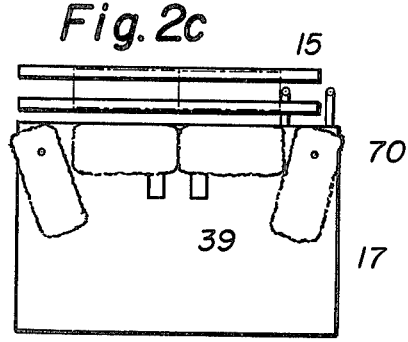
Figure 2F:
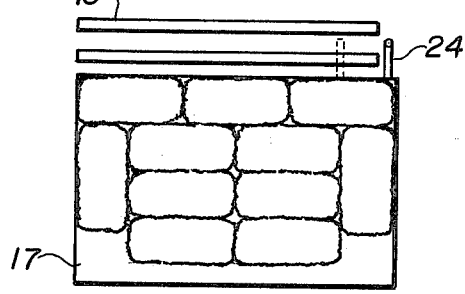

As can be seen in FIG. 2c, the formation of the tie-tier involves the insertion of a set of two bales between the exterior ends of the first set of three bales, causing the outer bales of the first set to rotate from a transverse position into a longitudinal position. To secure the exterior ends of these outer bales, a spiking mechanism 70 is provided. The construction and operation of the spiking mechanism 70 is best seen in FIGS. 3, 4, 9 and 10 and includes an elongated transverse shaft 71 rotatably supported on the frame 11 by brackets 72.

Figure 10:
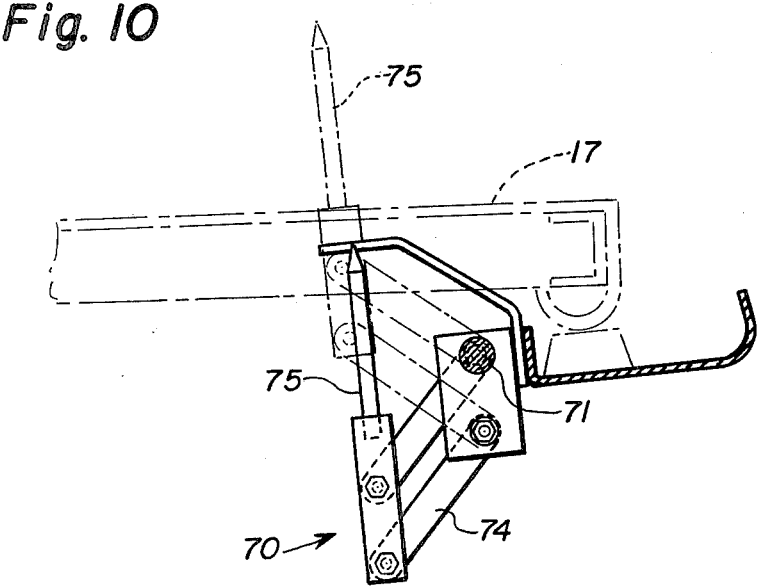
FIG. 10 is a partial cross-sectional detail view of the bale wagon taken along lines 10—10 of FIG. 4 to show the movement of the spike members from their retracted position to their operative position extending upwardly through the second table.

A connecting linkage 74, best seen in FIG. 10, interconnects the spike shaft 71 and a pair of spaced-apart spikes 75, which are movable upon rotation of the spike shaft 71 between a retracted position below table 17, as seen in solid lines in FIG. 10, and an operative position, seen in phantom in FIG. 10, extending upwardly through holes suitably positioned in the second table 17 best seen in FIG. 1. A third connecting member 76 is affixed to the spike shaft 71 proximate to the first connecting member 33 affixed to the kicker shaft 31. A fourth connecting member 78 is affixed to the spike shaft 71 proximate to the two bale trip 90, while a fifth connecting member 79 is also affixed to the shaft 71 proximate to the link 42.

Figure 9:
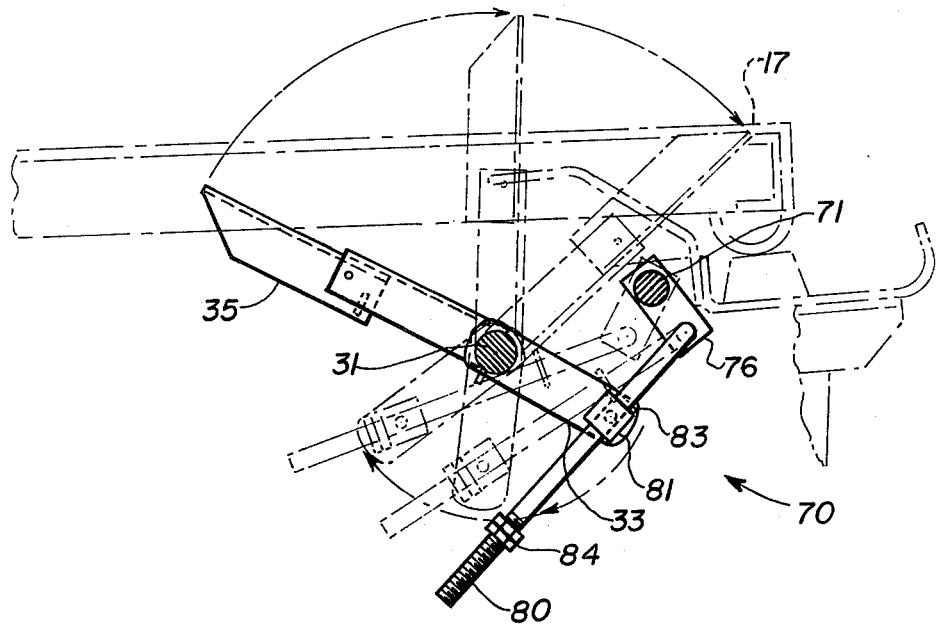
FIG. 9 is a partial cross-sectional detail view of the bale wagon taken along lines 9—9 of FIG. 4 to show the actuation of the spike shaft by movement of the kicker mechanism, movements of the various components being shown in phantom, some extraneous background structure being omitted for clarity.

A tie rod 80 is pivotally connected to the third connecting member 76 and is slidably received through a pivoted bushing 81 mounted on the first connecting member 33. A first stop 83 is affixed to the tie rod 80 on one side of the pivoted bushing 81, while a second stop 84, seen in FIG. 9 in the form of a nut threaded onto the tie rod 80, is spaced from the first stop 83 on the opposing side of the pivoted bushing 81. As is best seen in FIGS. 9 and 10, the activation of the spiking mechanism 70 is effected by the rotation of the kicker shaft 31. When the kicker members 35 are in their rearward position, as seen in solid lines in FIG. 9, the pivoted bushing 81 is positioned adjacent the first stop 83.

As the kicker members 35 are moved toward their forward position, the pivoted bushing 81 slides along the tie rod 80, as seen in phantom in FIG. 9, until becoming engaged with the second stop 84. The latter part of the movement of the kicker members 35 toward their forward position causes the first connecting member 33 to pull against the second stop 84 and rotate the spike shaft 71 through the third connecting member 76. The rotation of the spike shaft 71 induced by the movement of the kicker mechanism 30 effects a movement of the spikes 75 from their retracted position into their operative position. The activation of the spiking mechanism 70 is delayed, due to the spaced-apart relationship between the first and second stops 83,84, because it has been found that a delay in spiking the outer bales until the center bale starts moving back onto the first table 15 helps keep the two outside bales from following the center bale back onto the first table 15.

Referring now to FIGS. 3 and 5-8, it can be seen that a connecting rod 85 is pivotally connected to the fifth connecting member 79 and slidably received in a pivoted bushing 86 mounted on the link 42. The connecting rod 85 includes a stop 88 affixed thereto to be adjacent the pivoted bushing 86 when the link 42 is in its first position. The movement of the link 42 into its second position does not affect any substantial movement of the connecting rod 85 because of the sliding relationship between the pivoted bushing 86 and the rod 85. When the spike shaft 71 is rotated by the movement of the kicker shaft 31, as described above, the connecting rod 85 is moved rearwardly, as seen in phantom in FIG. 6. As will be described in further detail below, the return of the link 42 into its first position assures that the spiking mechanism 70 is returned into its retracted position by the engagement of the pivoted bushing 86 with the stop 88.

As is seen in FIGS. 2a-2f, the formation of a standard tier of bales is accomplished by the use of a number of sets of three bales conveyed from the first table 15 onto the second table 17, while the formation of a tie-tier involves a predetermined number of sets of two bales conveyed from the first table 15 onto the second table 17. Accordingly, it is necessary to provide a trip 90 at the first table 15 to correspond to the two-bale receiving position. The structure and actuation of the two bale trip 90 is best seen in FIGS. 3, 4 and 11.

As is best in FIG. 4, the three bale trip 24, corresponding to the three bale position on the first table 15, is connected via a linkage 93 to the single revolution clutch 22 to cause actuation thereof whenever a set of three bales has been loaded onto the first table to engage the trip 24. The two bale trip 90 is received within a bracket 94 affixed to the linkage 93 such that activation of the two bale trip 90 can effect actuation of the single revolution clutch 22 through the linkage 93 by engaging the bracket 94.

Figure 11:
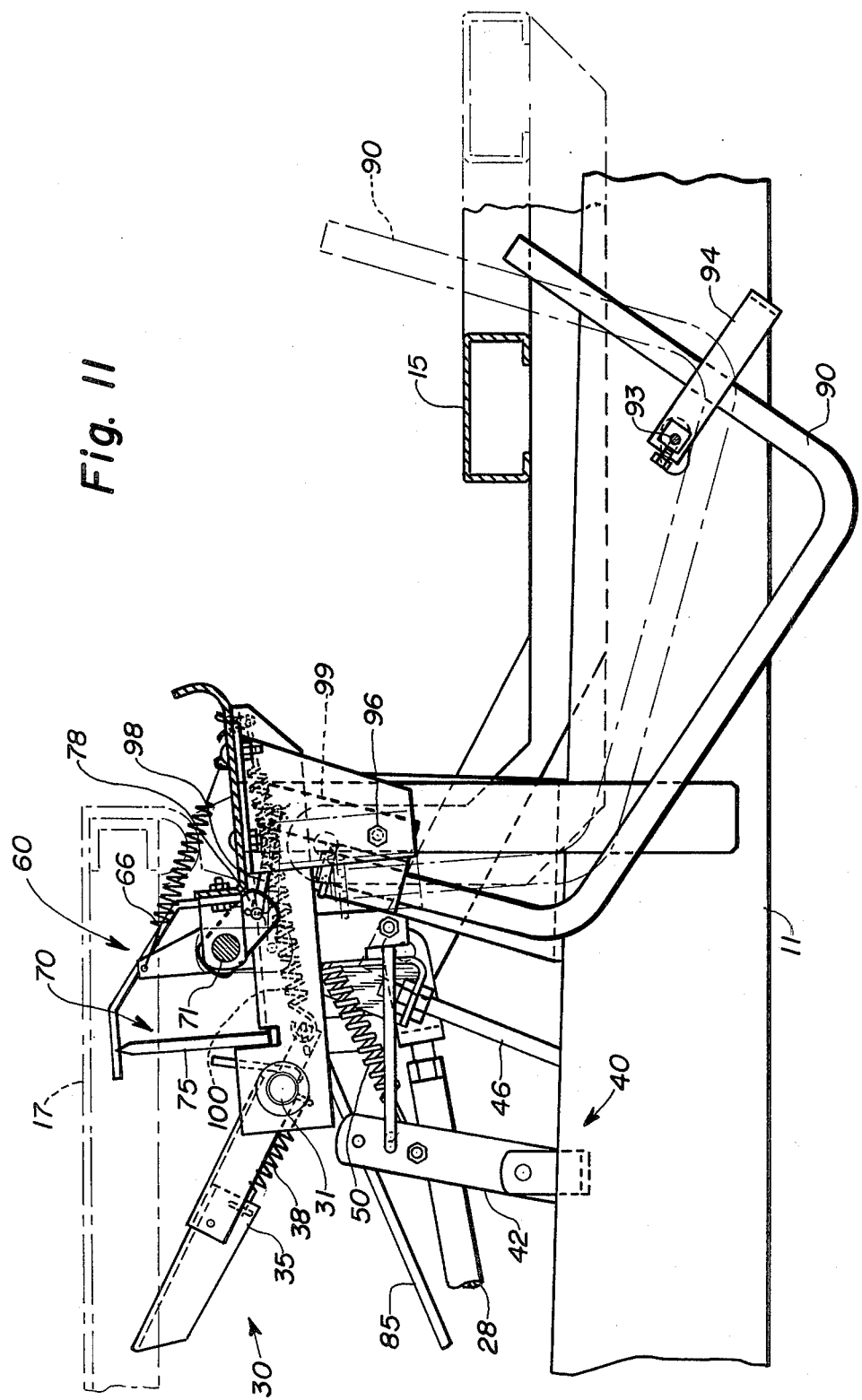
FIG. 11 is a cross-sectional view of the bale wagon taken along lines 11—11 of FIG. 4 to show the mechanism for effecting a movement of the two bale position trip from a retracted position to an operative position, shown in phantom.

Referring now to FIG. 11, it can be seen that the two bale trip 90 is movable from a retracted position, seen in solid lines in FIG. 11, and an operative position, seen in phantom in FIG. 11. As one skilled in the art will readily realize, it is desirable to have the two bale trip in the operative position only when a tie-tier is being formed and a set of two bales is to be conveyed from the first table 15 onto the second table 17. The two bale trip 90 is pivotally mounted on the frame 11 by the pivot 96.

To effect the movement of the two bale trip 90 from its retracted position into its operative position, a rigid rod 98 interconnects a tab 99 on the two bale trip 90 spaced from the pivotal connection 96 and the fourth connecting member 78 affixed to the spike shaft 71. As can be seen in phantom in FIG. 11, the rotational movement of the spike shaft 71 displaces the fourth connecting member 78 affixed thereto and effects a pivotal movement of the two bale trip 90 into its operative position through the rigid rod 98. When the spiking mechanism 70 is retracted by an appropriate rotation of the shaft 71, the two bale trip 90 is correspondingly moved into its retracted position.

Referring now to all the drawings, the operation of the above-described apparatus to form a tie-tier can be seen. The actuation mechanism 40 can be set at any time after the last first table delivery of the preceding standard tier, but before the initial first table delivery of the tie-tier by manipulating the actuation lever 43 and securing it against the support post 44 to cause a movement of the link 42 from its first position into its second position.

As is described above, the movement of the link 42 into its second position causes the drive member 46 to move into its engagement position and further causes a movement of the latching member 62 into its latching position. When a set of three bales has been loaded onto the first table 15 and the three bale trip 24 has been activated, the single revolution clutch 22 permits a rotation of the rotatable manner 25 to cause the crank 27 to engage the hook 47 on the drive member 46. The first half of the revolution of the rotatable member 25 effects a pivotal movement of the first table to convey the first set of three bales onto the second table 17. The second half of the single revolution of rotation of the rotatable member 25 returns the first table 15 to its bale receiving position. During this second half of the rotation of the rotatable member 25, the crank 27 drivingly engages the drive member 46 to effect the movement of the kicker mechanism 30. The movement of the kicker members 35 from their rearward position to their forward position causes the bale engaging members 37 to project upwardly through the slots 39 in the second table 17 to engage the center bale of the first set of three bales and move it forwardly back onto the first table 15. As is described above, the movement of the kicker mechanism 30, as caused by rotation of the kicker shaft 31, causes the spiking mecahnism 70 to engage the exterior ends of the outer bales of the first set of three bales by moving the spikes 75 into their operative position through the holes 18 in the second table 17, and further causes a movement of the two bale trip 90 from its retracted position into its operative position. As is diagrammatically seen in FIG. 2b, the center bale has been moved back onto the first table 15 while the kicker members 35 are latched into their forward position by the latching mechanism 60 to retain the spiking mechanism 70 and the two bale trip 90 in their operative positions.

The loading of another bale onto the first table 15 causes the center bale of the first set of three bales to engage the two bale trip 90 and actuate the single revolution clutch 22 to convey the set of two bales from the first table 15 onto the second table 17. It should be noted by one skilled in the art that the drive member 46 will have dropped by gravity into a free position out of engagement with the crank 27 by the time the rotatable member 25 begins the revolution to power the conveying of this first set of two bales onto the second table 17. As is seen in FIG. 2c, the loading of this first set of two bales onto the second table 17 causes the two outer bales of the first set of three bales to pivotally rotate about respective axes of rotation defined by the spikes 75 engaged into their outer ends.

Subsequent sets of two bales loaded on the first table 15 are conveyed from the first table 15 onto the second table 17 a predetermined number of times to cause a complete rotation of the outer bales of the first set of three bales into a longitudinally extending position, as seen in FIGS. 2d and 2e. As is diagrammatically seen in FIG. 2f, a final set of three bales can be loaded onto the second table 17 to complete a full tier of bales to be loaded onto the stack on the third table 19. However, before this last set of three bales can be loaded from the first table 15 onto the second table 17, the tie-tier forming apparatus must be deactivated so that the two bale trip will no longer be actuatable.

To deactivate the tie-tier forming apparatus, the operator must again manipulate the actuation lever 43 to disconnect it from the support post 44 and move it into the position seen in solid lines in FIG. 3. This manipulation of the actuation lever 43 causes the link 42 to return into its first position, thereby causing the latching member 62 to release the kicker members 35 and permit them to return to their rearward position by means of the force exerted by the return spring 100. Because the bale engaging member 37 are free to pivotally move forwardly relative to the base members 36, the kicker members 35 can slide beneath any bales positioned on the second table and return to their rearward position.

The retraction of the spiking mechanism 70 and the two bale trip 90 through a rotation of the spike shaft 71 is accomplished by one or a combination of two means. Firstly, the rotation of the kicker shaft 31 caused by the return spring 100 effects a movement of the first connecting member 33 to slide the pivoted bushing 81 along the tie rod 80 until it engages the first stop 83 to urge a rotation of the spike shaft 71. Secondly, the complete movement of the link 42 into its first position will engage the stop 88 on the connecting rod 85 if the spike shaft 71 has not already been completely rotated by the kicker mechanism 30 to effect a rotation of the spike shaft 71. This induced rotation of the spike shaft 71 effects a retraction of the spike members 75 from the outer bales of the first set of three bales and a retraction of the two bale trip 90 into its retracted position through the rigid rod 98. Accordingly, additional sets of three bales can be loaded onto the first table 15 and conveyed onto the second table 17 until it is desirable to form an additional tie tier.

It will be understood that various changes in the details, materials, steps and arrangement of parts which has been described and illustrated to explain the nature of the invention, will occur to and may be made by those skilled in the art upon a reading of the disclosure within the principles and scope of the invention. The foregoing description illustrates preferred embodiments of the invention. However, concepts, as based upon such a description, may be employed in other embodiments without departing from the scope of the invention. Accordingly, the following claims are intended to protect the invention broadly, as well as in the specific form shown herein.

Having thus described the invention, what is claimed is:

1. In a bale wagon for picking up bales lying on the ground and forming a stack of bales to be deposited at a remote location, said bale wagon having a frame; a pick-up means supported by said frame to engage and elevate bales lying on the ground; a first bale receiving table pivotally mounted on said frame adjacent said pickup means to receive bales elevated from the ground to form a row of bales in a three bale receiving position, said first table being pivotally movable between a bale receiving position and a bale transfer position; a second tier forming table mounted on said frame adjacent said first table to receive rows of bales therefrom and form a tier of bales; first conveying means for conveying rows of bales from said first table onto said second table; a third stack forming table mounted on said frame adjacent said second table to receive tiers of bales therefrom and form a stack of bales thereon; second conveying means for conveying tiers of bales from said second table onto said third table; and drive means for operatively powering said first conveying means, said drive means including a rotatable member, said first conveying means including a linkage mechanism interconnecting said rotatable member and said first table to effect a pivotal movement of said first table to convey bales from said first table onto said second table, the improvement comprising:

kicker means for moving the center bale of a set of three bales conveyed onto said second table back onto said first table; and actuation means cooperable with said drive means to operatively power said kicker means after bales have been conveyed from said first table onto said second table, said actuation means being engageable with said rotatable member to move said center bale back onto said first table as first said table is returning to the bale receiving position.

2. The bale wagon of claim 1 wherein said actuation means includes a drive member movable between a free position and an engagement position, and an actuation linkage operable to move said drive member from said free position to said engagement position, said drive member being engageable with said rotatable member when in said engagement position.

3. The bale wagon of claim 2 further having spiking means engageable with the exterior ends of a set of three bales conveyed onto said second table to rotatably hold the end bales of said set of bales for rotation about respective axes, said spiking means being movable between an operative position in which said spiking means is engaged with said end bales and a retracted position in which the spiking means is not engaged with said end bales.

4. The bale wagon of claim 3 wherein said kicker means and said spiking means are interconnected by a tie rod such that the movement of said kicker means to move the center bale back onto said first table effects a movement of said spiking means from said retracted position to said operative position.

5. The bale wagon of claim 4 further comprising a two bale trip movable from a retracted position to an operative position when said kicker means moves said center bale back onto said first table, said two bale trip being operable to establish a two bale receiving position centered on said three bale receiving position such that said first conveying means will be operable to convey sets of two bales from said first table onto said second table, said two bale trip being selectively returnable to its retracted position to establish said three bale receiving position.

6. The bale wagon of claim 5 wherein said kicker means includes at least one kicker member movable between a rearward position and a forward position, said at least one kicker member being engageable with said center bale when moving from said rearward position to said forward position to move said center bale from said second table back onto said first table.

7. The bale wagon of claim 6 further comprising latching means cooperable with said kicker means to latch said at least one kicker member in said forward position.

8. The bale wagon of claim 7 wherein said actuation means further includes a link pivotally mounted on said frame for movement between a first position and a second position, means for selectively pivotally moving said link, and a first spring interconnecting said link and said drive member such that the selective movement of said link from said first position to said second position causes said spring to urge said drive member from said free position to said engagement position.

9. The bale wagon of claim 8 wherein said drive member is pivotally connected to said kicker means to permit a movement thereof from said free position to said engagement position without effecting any significant movement of said at least one kicker member.

10. The bale wagon of claim 9 wherein said latching means includes a latching member pivotally mounted on said frame adjacent said kicker means, and being movable into a latching position, and an elongated rod interconnecting said link and said latching member to effect movement of said latching member into said latching position when said link is moved into said second position, said kicker means further including a latching tab engageable with said latching member when said at least one kicker member moves into said forward position to latch said at least one kicker member in said forward position.

11. The bale wagon of claim 10 wherein said kicker means comprises:

a first transverse shaft rotatably supported by said frame;

a pair of kicker members affixed to said first shaft for rotation therewith to move between said rearward and forward positions;

a first connection member affixed to said first shaft for pivotal connection with said drive member at a first pivot spaced from said first shaft to effect rotation thereof;

a second connection member affixed to said first shaft for connection with said tie rod; and said latching tab being affixed to said first shaft for rotation therewith to engage said latching member.

12. The bale wagon of claim 11 wherein said spiking means comprises:

a second transverse shaft rotatably supported by said frame;

a pair of spaced apart spike members defining the respective axes of rotation for said end bales, said spike members being connected to said second shaft such that rotation thereof moves said spike members between said operative and retracted positions;

a third connecting member affixed to said second shaft for connection to said tie rod at a second pivot spaced from said second shaft; and a fourth connecting member affixed to said second shaft for connection to said two bale trip such that when said second shaft is rotated to move said spike members into said operative position said two bale trip is operatively moved into its operative position.

13. The bale wagon of claim 12 wherein said tie rod is slidably and pivotally received by said second connection member, said tie rod including first and second stops to limit the sliding movement of said tie rod relative to said second connection member, said stops being positioned such that said second shaft is not operatively rotated to move said spike members into said operative position until said kicker members have completed a substantial portion of the movement toward said forward position.

14. The bale wagon of claim 13 wherein each said kicker member includes a base member affixed to said first shaft and rotatable therewith, and a bale engaging member pivotally connected to said base member to permit movement thereof forwardly of a linearly extending position, said bale engaging member being biased toward said linearly extending position by a spring interconnecting said base member and said bale engaging member.

15. The bale wagon of claim 14 wherein said means for selectively pivotally moving said link includes an actuation lever selectively fixable in one of two positions corresponding to the first and second positions of said link.

16. The bale wagon of claim 2 or 13 wherein said rotatable member includes a crank rotatable at a distance spaced from the axis of rotation of the rotatable member, said drive member including a hook engageable with said crank for rotation therewith when said drive member is moved into said engagement position.

17. The bale wagon of claim 16 wherein said drive means includes a single revolution clutch which is activated when said first table has been loaded with a full set of bales to operably power a single revolution of said rotatable member to pivot said first table, the first half of the single revolution of said rotatable member being operable to pivotally move said first table from a bale receiving position to a bale transfer position wherein said bales are deposited on said second table, said drive member being positioned such that said crank engages said hook during the second half of the single revolution of said rotatable member so that said kicker means is operable to move said center bale back to said first table as said first table is returning to said bale receiving position.

* * * * *